(12) United States Patent
Tojigamori et al.

(10) Patent No.: US 10,644,358 B2
(45) Date of Patent: May 5, 2020

(54) AQUEOUS DUAL-ION SECONDARY BATTERY

(71) Applicant: TOYOTA JIDOSHA KABUSHIKI KAISHA, Toyota-shi, Aichi-ken (JP)

(72) Inventors: Takeshi Tojigamori, Susoni (JP); Hideki Nakayama, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 26 days.

(21) Appl. No.: 16/023,149

(22) Filed: Jun. 29, 2018

(65) Prior Publication Data
US 2019/0036173 A1 Jan. 31, 2019

(30) Foreign Application Priority Data

Jul. 26, 2017 (JP) .................... 2017-144130

(51) Int. Cl.
*H01M 10/36* (2010.01)
*H01M 4/48* (2010.01)
*H01M 4/587* (2010.01)

(52) U.S. Cl.
CPC ............ *H01M 10/36* (2013.01); *H01M 4/48* (2013.01); *H01M 4/587* (2013.01); *H01M 2300/0002* (2013.01)

(58) Field of Classification Search
CPC .................. H01M 10/36; H01M 4/48
See application file for complete search history.

(56) References Cited

U.S. PATENT DOCUMENTS

2016/0036010 A1* 2/2016 Saruwatari .......... H01M 2/0202
429/158
2017/0194106 A1 7/2017 Majima et al.

FOREIGN PATENT DOCUMENTS

| JP | 2013-065534 A | 4/2013 |
| JP | 2015-154003 A | 8/2015 |
| JP | 2017-091994 A | 5/2017 |

OTHER PUBLICATIONS

Liumin Suo et al., Batteries, "Water-in-Salt" Electrolyte Enables High-Voltage Aqueous Lithium-Ion Chemistries, Science 350, 938-943 (2015), vol. 350, Issue 6265, Nov. 20, 2015, (Year: 2015).*

* cited by examiner

*Primary Examiner* — Matthew J Merkling
(74) *Attorney, Agent, or Firm* — Sughrue Mion, PLLC

(57) ABSTRACT

Disclosed is a dual-ion secondary battery of high power and a high level of safety. The dual-ion secondary battery is an aqueous dual-ion secondary battery including: a cathode; an anode; and an aqueous electrolyte solution, wherein the cathode includes graphite as a cathode active material, the anode includes titanium oxide as an anode active material, and the aqueous electrolyte solution contains no less than 10 mol of lithium bis(trifluoromethanesulfonyl)imide per kilogram of water.

2 Claims, 3 Drawing Sheets

AQUEOUS DUAL-ION SECONDARY BATTERY

FIELD

The present application discloses a dual-ion secondary battery using an aqueous electrolyte solution.

BACKGROUND

Patent Literature 1 discloses a nonaqueous dual-ion secondary battery using a positive electrode active material into and out of which an anion in a nonaqueous electrolyte solution goes, and a negative electrode active material into and out of which a cation in the nonaqueous electrolyte solution goes. A dual-ion secondary battery has high energy density, and various advantages such as suitability for high-speed charging and discharging.

CITATION LIST

Patent Literature

Patent Literature 1: JP 2017-091994 A

SUMMARY

Technical Problem

As disclosed in Patent Literature 1, the conventional dual-ion secondary battery uses a nonaqueous electrolyte solution as an electrolyte solution. However, according to the findings of the inventors of the present application, there is a problem of low ion conductivity of an electrolyte solution, which leads to bad input-output characteristics of the battery in a nonaqueous dual-ion secondary battery. Safety has to be also improved more because the battery uses nonaqueous solvent. In this point, it can be considered to use not a nonaqueous electrolyte solution but an aqueous electrolyte solution as an electrolyte solution in a dual-ion secondary battery. However, there is a problem of a narrow potential window in an aqueous electrolyte solution, and selection of a cathode active material and an anode active material is considerably restricted. Thus, it has not been duly considered to configure a dual-ion secondary battery using an aqueous electrolyte solution.

Solution to Problem

The present application discloses an aqueous dual-ion secondary battery comprising: a cathode; an anode; and an aqueous electrolyte solution, wherein the cathode includes graphite as a cathode active material, the anode includes titanium oxide as an anode active material, and the aqueous electrolyte solution contains no less than 10 mol of lithium bis(trifluoromethanesulfonyl)imide per kilogram of water, as one means for solving the above problems.

Advantageous Effects

The aqueous dual-ion secondary battery of the present disclosure achieves a high level of safety because using an aqueous electrolyte solution as an electrolyte solution.

A high concentration of LiTFSI contained in the aqueous electrolyte solution expands a potential window of the aqueous electrolyte solution. Specifically, the concentration of LiTFSI of no less than 10 mol/kg-$H_2O$ expands the upper limit of the potential window of the aqueous electrolyte solution to approximately 4.5 V, and leads to the lower limit thereof of approximately 2 V. In the aqueous dual-ion secondary battery of the present disclosure, graphite inserts and extracts TFSI anions at approximately 4.5 V, which is the upper limit of the potential window of the aqueous electrolyte solution, and titanium oxide inserts and extracts Li ions at approximately 2 V, which is the lower limit thereof. That is, a secondary battery of approximately 2 V can be configured, making the best use of the potential window of the aqueous electrolyte solution.

In the aqueous dual-ion secondary battery of the present disclosure, utilizing a layer structure of graphite in the cathode active material makes it possible to properly insert and extract TFSI anions of a long ionic radius.

Further, moving TFSI anions in the vicinity of the cathode and Li ions in the vicinity of the anode is enough to operate the aqueous dual-ion secondary battery of this disclosure. Here, large amounts of TFSI anions and Li ions exist in the vicinity of the cathode and the anode because a high concentration of LiTFSI is contained in the aqueous electrolyte solution in the dual-ion secondary battery of this disclosure. Thus, TFSI anions and Li ions are efficiently supplied to the cathode and the anode respectively when the aqueous dual-ion secondary battery of the present disclosure operates, and necessary travel distances of ions are short, which can improve the power as the secondary battery.

DETAILED DESCRIPTION OF EMBODIMENTS

Figure 1:
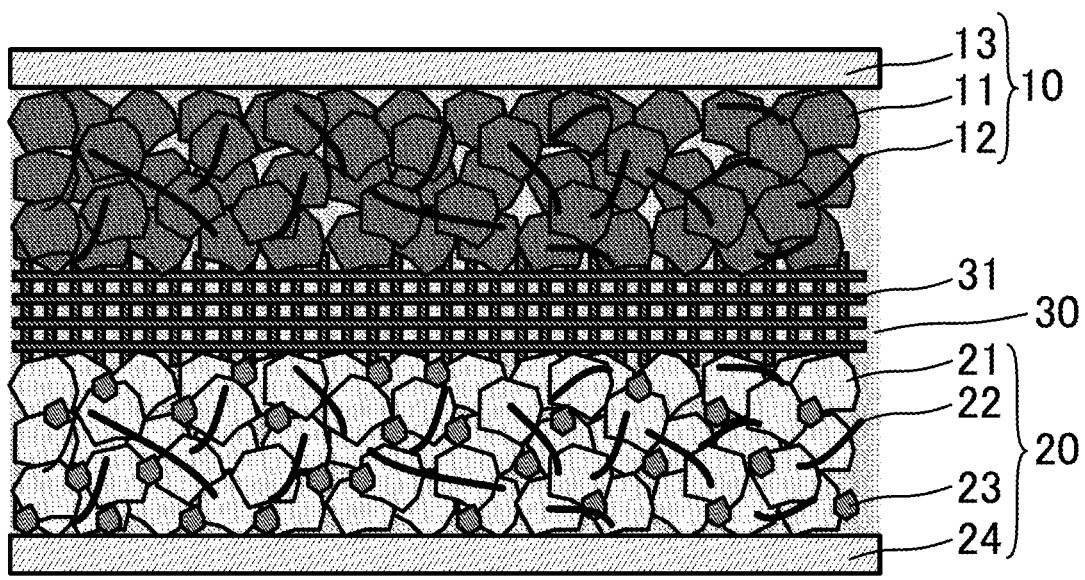
FIG. 1 is an explanatory schematic view of structure of an aqueous dual-ion secondary battery 100.

FIG. 1 schematically shows structure of an aqueous dual-ion secondary battery 100. As shown in FIG. 1, the aqueous dual-ion secondary battery 100 includes a cathode 10, an anode 20, and an aqueous electrolyte solution 30. Here, a feature of the aqueous dual-ion secondary battery 100 is that the cathode 10 includes graphite as a cathode active material 11, the anode 20 includes titanium oxide as an anode active material 21, and the aqueous electrolyte solution 30 contains no less than 10 mol of lithium bis (trifluoromethanesulfonyl)imide (LiTFSI) per kilogram of water.

1. Cathode

The cathode 10 includes graphite as the cathode active material 11. The cathode 10 may optionally include a binder 12. The binder 12 binds the cathode active material 11. Further, the cathode 10 may include a cathode current collector 13. In the aqueous dual-ion secondary battery 100 shown in FIG. 1, the cathode 10 is formed of the cathode current collector 13, and a cathode active material layer provided over a surface of the cathode current collector 13 which contains the cathode active material 11 and the binder 12.

1.1. Cathode Active Material

The cathode 10 includes graphite as the cathode active material 11. Graphite may be artificial, and may be natural graphite. According to the findings of the inventors of the present application, in the aqueous dual-ion secondary battery 100, utilizing a layer structure of graphite in the cathode active material 11 makes it possible to properly insert and extract TFSI anions of a long ionic radius which are contained in the aqueous electrolyte solution 30. If carbon material other than graphite (for example, carbon black) is used as the cathode active material, TFSI anions are difficult to be inserted and extracted. According to the findings of the inventors, while the concentration of LiTFSI in the aqueous electrolyte solution 30 of no less than 10 mol/kg-$H_2O$ expands the upper limit of a potential window of the aqueous electrolyte solution 30 to approximately 4.5 V, graphite inserts and extracts TFSI anions at a voltage approximate to this upper limit. Thus, charging and discharging on the cathode side can be carried out, making the best use of the potential window of the aqueous electrolyte solution 30 in the aqueous dual-ion secondary battery 100.

The cathode active material 11 may contain any cathode active material in addition to graphite to the extent that the above described problems can be solved. The cathode active material 11 preferably consists of graphite in view of more efficiently inserting and extracting TFSI anions in the aqueous dual-ion secondary battery 100.

The shape of the cathode active material 11 is not specifically restricted. A preferred example thereof is a particulate shape. When the cathode active material 11 has a particulate shape, the primary particle size thereof is preferably 1 nm to 100 µm. The lower limit thereof is more preferably no less than 10 nm, further preferably no less than 50 nm, and especially preferably no less than 100 nm; and the upper limit thereof is more preferably no more than 30 µm, and further preferably no more than 10 µm. Primary particles of the cathode active material 11 one another may assemble to form a secondary particle. In this case, the secondary particle size is not specifically restricted, but is usually 0.5 µm to 100 µm. The lower limit thereof is preferably no less than 1 µm, and the upper limit thereof is preferably no more than 20 µm. The particle sizes of the cathode active material 11 within these ranges make it possible to obtain the cathode 10 further superior in ion conductivity and electron conductivity.

When the cathode 10 includes the cathode active material layer, the amount of the cathode active material 11 contained in the cathode active material layer is not specifically restricted. For example, on the basis of the whole of the cathode active material layer (100 mass %), the content of the cathode active material 11 is preferably no less than 10 mass %, more preferably no less than 20 mass %, and further preferably no less than 40 mass %. The upper limit is not specifically restricted, but is preferably no more than 99 mass %, more preferably no more than 97 mass %, and further preferably no more than 95 mass %. The content of the cathode active material 11 within this range makes it possible to obtain the cathode 10 further superior in ion conductivity and electron conductivity.

1.2. Binder

The cathode 10 may include the binder 12 for binding the cathode active material 11. Any known binder used for an aqueous secondary battery can be employed as the binder 12. Examples thereof include styrene-butadiene rubber (SBR), carboxymethyl cellulose (CMC), acrylonitrile-butadiene rubber (ABR), butadiene rubber (BR), polyvinylidene fluoride (PVDF), and polytetrafluoroethylene (PTFE). One binder may be used individually, or two or more binders may be mixed to be used as the binder 12.

The amount of the binder 12 included in the cathode 10 is not specifically restricted. For example, when the cathode 10 includes the cathode active material layer, the content of the binder 12 is preferably no less than 1 mass %, more preferably no less than 3 mass %, and further preferably no less than 5 mass %, on the basis of the whole of the cathode active material layer (100 mass %). The upper limit is not specifically restricted, but is preferably no more than 90 mass %, more preferably no more than 70 mass %, and further preferably no more than 50 mass %. The content of the binder 12 within this range makes it possible to properly bind the cathode active material 11, and to obtain the cathode 10 further superior in ion conductivity and electron conductivity.

When the cathode 10 includes the cathode active material layer, the thickness of the cathode active material layer is not specifically restricted, but, for example, is preferably 0.1 µm to 1 mm, and more preferably 1 µm to 100 µm.

1.3. Cathode Current Collector

A known metal that can be used as a cathode current collector of an aqueous secondary battery can be used for the cathode current collector 13. Examples thereof include metallic material containing at least one element selected from the group consisting of Cu, Ni, Al, V, Au, Pt, Mg, Fe, Ti, Pb, Co, Cr, Zn, Ge, In, Pb, Sn and Zr. The form of the cathode current collector 13 is not specifically restricted, and can be any form such as foil and mesh.

1.4. Another Structure

The cathode 10 may optionally include any material in addition to the cathode active material 11, the binder 12, and the cathode current collector 13. For example, a conductive additive for securing conductivity can be considered to be included. As described above, graphite, which has good conductivity, is used as the cathode active material 11 in the aqueous dual-ion secondary battery 100, which makes it possible to secure good electron conductivity without further inclusion of a conductive additive.

2. Anode

The anode 20 includes titanium oxide as the anode active material 21. The anode 20 may optionally include a binder 22, and a conductive additive 23. The binder 22 binds the anode active material 21, and the conductive additive 23. The conductive additive 23 improves electron conductivity of the anode 20. Further, the anode 20 may include an anode current collector 24. In the aqueous dual-ion secondary battery 100 shown in FIG. 1, the anode 20 is formed of the anode current collector 24, and an anode active material layer provided over a surface of the anode current collector 24 which contains the anode active material 21, the binder 22, and the conductive additive 23.

2.1. Anode Active Material

The anode 20 includes titanium oxide as the anode active material 21. The form of titanium oxide may be anatase, may be rutile, and may be brookite. According to the findings of the inventors of the present application, in the aqueous dual-ion secondary battery 100, while the concentration of LiTFSI in the aqueous electrolyte solution 30 of no less than 10 mol/kg-$H_2O$ leads to the lower limit of the potential window of the aqueous electrolyte solution 30 of approximately 2 V, titanium oxide inserts and extracts Li ions at a voltage approximate to this lower limit. Thus, charging and discharging on the anode side can be carried out, making the best use of the potential window of the aqueous electrolyte solution 30.

The anode active material 21 may contain any anode active material in addition to titanium oxide to the extent that the above described problems can be solved. The anode active material 21 preferably consists of titanium oxide in view of efficiently inserting and extracting Li ions at a voltage approximate to the lower limit of the potential window of the aqueous electrolyte solution 30 in the aqueous dual-ion secondary battery 100.

The shape of the anode active material 21 is not specifically restricted. A preferred example thereof is a particulate shape. When the anode active material 21 has a particulate shape, the primary particle size thereof is preferably 1 nm to 100 μm. The lower limit thereof is more preferably no less than 10 nm, further preferably no less than 50 nm, and especially preferably no less than 100 nm; and the upper limit thereof is more preferably no more than 30 μm, and further preferably no more than 10 μm. Primary particles of the anode active material 21 one another may assemble to form a secondary particle. In this case, the secondary particle size is not specifically restricted, but is usually 0.5 μm to 100 μm. The lower limit thereof is preferably no less than 1 μm, and the upper limit thereof is preferably no more than 20 μm. The particle sizes of the anode active material 21 within these ranges make it possible to obtain the anode 20 further superior in ion conductivity and electron conductivity.

When the anode 20 includes the anode active material layer, the amount of the anode active material 21 contained in the anode active material layer is not specifically restricted. For example, on the basis of the whole of the anode active material layer (100 mass %), the content of the anode active material 21 is preferably no less than 10 mass %, more preferably no less than 20 mass %, and further preferably no less than 40 mass %. The upper limit is not specifically restricted, but is preferably no more than 99 mass %, more preferably no more than 97 mass %, and further preferably no more than 95 mass %. The content of the anode active material 21 within this range makes it possible to obtain the anode 20 further superior in ion conductivity and electron conductivity.

2.2. Binder

The anode 20 may include the binder 22 for binding the anode active material 21, the conductive additive 23, and the anode active material 21 and the conductive additive 23. Any known binder that is used for an aqueous secondary battery, including the described examples as the binder 12 etc. can be employed as the binder 22. The binder 22 of the anode 20 may be either the same as, or different from the binder 12 of the cathode 10.

The amount of the binder 22 included in the anode 20 is not specifically restricted. For example, when the anode 20 includes the anode active material layer, the content of the binder 22 is preferably no less than 1 mass %, more preferably no less than 3 mass %, and further preferably no less than 5 mass %, on the basis of the whole of the anode active material layer (100 mass %). The upper limit is not specifically restricted, but is preferably no more than 90 mass %, more preferably no more than 70 mass %, and further preferably no more than 50 mass %. The content of the binder 22 within this range makes it possible to properly bind the anode active material 21, and the conductive additive 23, and to obtain the anode 20 further superior in ion conductivity and electron conductivity.

2.3. Conductive Additive

The anode 20 may include the conductive additive 23 for improving electron conductivity. Any conductive additive used in an aqueous lithium ion secondary battery can be employed as the conductive additive 23. Examples thereof include a conductive additive containing carbon material selected from Ketjen black (KB), vapor grown carbon fiber (VGCF), acetylene black (AB), a carbon nanotube (CNT), and carbon nanofiber (CNF). Or, metallic material that can bear an environment where the battery is to be used may be used. One conductive additive may be used individually, or two or more conductive additives may be mixed to be used as the conductive additive 23. Any form such as powder and fiber can be employed as the form of the conductive additive 23.

The amount of the conductive additive 23 included in the anode 20 is not specifically restricted. For example, when the anode 20 includes the anode active material layer, the content of the conductive additive 23 is preferably no less than 1 mass %, more preferably no less than 3 mass %, and further preferably no less than 5 mass %, on the basis of the whole of the anode active material layer (100 mass %). The upper limit is not specifically restricted, but preferably no more than 90 mass %, more preferably no more than 70 mass %, and further preferably no more than 50 mass %. The content of the conductive additive 23 within this range makes it possible to obtain the anode 20 further superior in ion conductivity and electron conductivity.

When the anode 20 includes the anode active material layer, the thickness of the anode active material layer is not specifically restricted, but, for example, is preferably 0.1 μm to 1 mm, and more preferably 1 μm to 100 μm.

2.4. Anode Current Collector

A known metal that can be used as an anode current collector of an aqueous secondary battery can be used for the anode current collector 24. Examples thereof include metallic material containing at least one element selected from the group consisting of Cu, Ni, Al, V, Au, Pt, Mg, Fe, Ti, Co, Cr, Zn, Ge and In. Ti, Pb, Zn, Sn, Zr and In are preferable in view of cycle stability as a secondary battery. Among them, Ti is preferable. The form of the anode current collector 24 is not specifically restricted, and can be any form such as foil and mesh.

2.5. Other Components

The anode 20 may optionally include any material in addition to the anode active material 21, the binder 22, the conductive additive 23, and the anode current collector 24.

3. Aqueous Electrolyte Solution

The aqueous electrolyte solution 30 contains no less than 10 mol of lithium bis(trifluoromethanesulfonyl)imide (LiTFSI) per kilogram of water. Needless to say, LiTFSI dissolves in water to dissociate into Li ions and TFSI anions in the aqueous electrolyte solution 30. That is, LiTFSI dissolves in 1 kg of water so as to have a concentration of less than 10 mol, in the aqueous electrolyte solution 30.

3.1. Solvent

Solvent here contains water as the main component. That is, no less than 50 mol %, preferably no less than 70 mol %, and more preferably no less than 90 mol % of the solvent that forms the aqueous electrolyte solution 30 (liquid component) is water, on the basis of the total amount of the solvent (100 mol %). In contrast, the upper limit of the proportion of water in the solvent is not specifically restricted.

3.2. Electrolyte

As described above, the aqueous electrolyte solution 30 contains LiTFSI. LiTFSI functions as an electrolyte. Preferably no less than 50 mol %, more preferably no less than 70 mol %, and further preferably no less than 90 mol % of electrolytes contained (dissolving) in the electrolyte solution is LiTFSI in the aqueous electrolyte solution 30, on the basis of the total amount of the electrolytes (100 mol %).

The aqueous electrolyte solution 30 contains no less than 10 mol, preferably no less than 12 mol, and more preferably no less than 15 mol of LiTFSI per kilogram of water. The upper limit is not specifically restricted, and, for example, is preferably no more than 25 mol. The aqueous electrolyte solution 30 has such a tendency that as the concentration of LiTFSI is high, the potential window of the aqueous electrolyte solution 30 expands. Further enlarging the potential window of the aqueous electrolyte solution can easily suppress decomposition of the electrolyte solution due to overvoltage etc.

The aqueous electrolyte solution 30 may contain any electrolyte in addition to LiTFSI. Examples thereof include imide-based electrolytes such as lithium bis(fluorosulfonyl) imide. $LiPF_6$, $LiBF_4$, $Li_2SO_4$, $LiNO_3$, etc. may be contained as well. Preferably no more than 50 mol %, more preferably no more than 30 mol %, and further preferably no more than 10 mol % of electrolytes contained (dissolving) in the electrolyte solution is electrolytes other than LiTFSI, on the basis of the total amount of the electrolytes (100 mol %).

3.3. Optional Components

The aqueous electrolyte solution 30 may contain any other components in addition to the above described solvent and electrolytes. For example, alkali metals other than lithium, alkaline earth metals, etc. as cations can be added as the other components. Further, lithium hydroxide etc. may be contained for adjusting pH of the aqueous electrolyte solution 30.

pH of the aqueous electrolyte solution 30 is not specifically restricted. There are general tendencies for a potential window on the oxidation side to expand as pH of an aqueous electrolyte solution is low, while for that on the reduction side to expand as pH thereof is high. In the aqueous electrolyte solution 30, while a higher concentration of LiTFSI leads to lower pH, the potential window on the reduction side can be sufficiently expanded even if a high concentration of LiTFSI is contained.

3.4. Separator

A separator 31 is preferably provided between the cathode 10 and the anode 20 in the aqueous dual-ion secondary battery 100. A separator used in conventional aqueous electrolyte solution batteries (NiMH, Zu-Air, etc.) is preferably employed as the separator 31. For example, a hydrophilic separator such as nonwoven fabric made of cellulose can be preferably used. The thickness of the separator 31 is not specifically restricted. For example, a separator of 5 μm to 1 mm in thickness can be used.

4. Other Components of Battery

Terminals, a battery case, etc. are equipped with the aqueous dual-ion secondary battery 100, in addition to the above described structure. The other components are obvious for the skilled person who referred to the present application, and thus description thereof is omitted here.

The aqueous dual-ion secondary battery 100 as described above can be produced by applying a known method. For example, the battery 100 can be produced as follows. The method for producing the battery 100 is not limited to the following method.

(1) the cathode active material etc. to form the cathode active material layer is dispersed in solvent, to obtain a cathode mixture paste (slurry). Water and various organic solvents can be used as the solvent used in this case without specific restriction. A surface of the cathode current collector 13 is coated with the cathode mixture paste (slurry) using a doctor blade or the like, and thereafter dried, to form the cathode active material layer over the surface of the cathode current collector 13, to be the cathode 10.

(2) the anode active material etc. to form the anode active material layer is dispersed in solvent, to obtain an anode mixture paste (slurry). Water and various organic solvents can be used as the solvent used in this case without specific restriction. A surface of the anode current collector 24 is coated with the anode mixture paste (slurry) using a doctor blade or the like, and thereafter dried, to form the anode active material layer over the surface of the anode current collector 24, to be the anode 20.

(3) the separator 31 is sandwiched between the cathode and the anode, to obtain a stack including the anode current collector 24, the anode active material layer, the separator 31, the cathode active material layer, and the cathode current collector 13 in this order. The stack is equipped with other members such as terminals if necessary.

(4) the stack is stored in a battery case, and the battery case is filled with the aqueous electrolyte solution 30. The battery case which the stack is stored in and is filled with the electrolyte solution is sealed up such that the stack is immersed in the aqueous electrolyte solution 30, to be the battery 100.

As described above, the aqueous electrolyte solution 30 is used as an electrolyte solution in the aqueous dual-ion secondary battery 100, which achieves a high level of safety. A high concentration of LiTFSI contained in the aqueous electrolyte solution 30 expands the potential window of the aqueous electrolyte solution 30. Specifically, the concentration of LiTFSI of no less than 10 mol/kg-$H_2O$ expands the upper limit of the potential window of the aqueous electrolyte solution 30 to approximately 4.5 V, and leads to the lower limit thereof of approximately 2 V. In the aqueous dual-ion secondary battery 100, graphite (cathode active material 11) inserts and extracts TFSI anions at approximately 4.5 V, which is the upper limit of the potential window of the aqueous electrolyte solution 30, and titanium oxide (anode active material 21) inserts and extracts Li ions at approximately 2 V, which is the lower limit thereof. That is, a secondary battery of approximately 2 V can be configured, making the best use of the potential window of the aqueous electrolyte solution 30. In the aqueous dual-ion secondary battery 100, utilizing a layer structure of graphite in the cathode active material 11 makes it possible to properly insert and extract TFSI anions of a long ionic radius as well. Further, moving TFSI anions in the vicinity of the cathode and Li ions in the vicinity of the anode is enough to operate the aqueous dual-ion secondary battery 100. Here, large amounts of TFSI anions and Li ions exist in the vicinity of the cathode 10 and the anode 20 because a high concentration of LiTFSI is contained in the aqueous electrolyte solution 30 in the dual-ion secondary battery 100. Thus, TFSI anions and Li ions are efficiently supplied to the cathode 10 and the anode 20 respectively when the aqueous dual-ion secondary battery 100 operates, and necessary travel distances of ions are short, which can improve the power as the secondary battery.

EXAMPLES

1. Example 1.1 Making Cathode

Powdered graphite as a cathode active material, and a binder (PVdF) were kneaded along with solvent, so as to have a mass ratio of the cathode active material:the binder=92.5:7.5, to obtain a cathode mixture paste. Titanium foil was coated with the obtained cathode mixture paste by doctor blade, dried, and thereafter pressed, to obtain a cathode having an electrode weight of 3.8 mg/$cm^2$.

1.2. Making Anode

Powdered titanium oxide in the form of anatase as an anode active material, a conductive additive (acetylene black and VGCF), and a binder (PVdF) were kneaded along with solvent, so as to have a mass ratio of the anode active material:the conductive additive:the binder=85:10:5, to obtain an anode mixture paste. Titanium foil was coated with the obtained anode mixture paste by doctor blade, dried, and thereafter pressed, to obtain an anode having an electrode weight of 7.1 mg/cm$^2$.

1.3. Making Battery for Evaluation

The cathode that was stamped out to have a circular shape of approximately 16 mm in diameter, the anode that was stamped out to have a circular shape of approximately 16 mm in diameter, a Ag/AgCl reference electrode, and an aqueous electrolyte solution were assembled in a batch cell for evaluating batteries manufactured by EC FRONTIER CO., Ltd., to make an aqueous dual-ion secondary battery. In the aqueous electrolyte solution, 21 mol of LiTFSI was dissolved per kilogram of water.

1.4. Evaluation of Battery

Charge and discharge testing was carried out on the made aqueous dual-ion secondary battery under the following conditions. It is noted that potential of the cathode was measured by means of the reference electrode.

Charging rate in Charge Testing: 0.1 C

Figure 2:
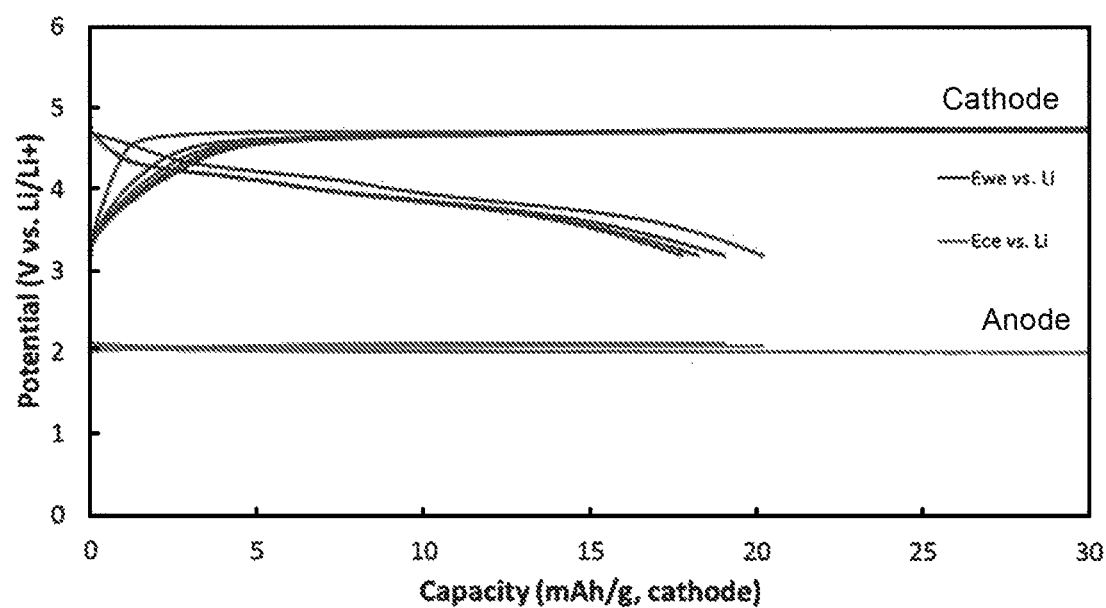
FIG. 2 shows charge-discharge curves of an aqueous dual-ion secondary battery according to Example.

End Potential in Charge Testing: potential such that the potential of the cathode was 4.8 V with Li metal as the reference Discharging Rate in Discharge Testing: 0.1 C End Potential in Discharge Testing: potential such that the potential of the cathode was 3.2 V with Li metal as the reference FIG. 2 shows the results of the evaluation. As is clear from the results in FIG. 2, in the made aqueous dual-ion secondary battery, graphite inserted and extracted TFSI anions at approximately 4.5 V, which was the upper limit of the potential window of the aqueous electrolyte solution, and titanium oxide inserted and extracted Li ions at approximately 2 V, which was the lower limit thereof. This made it possible to carry out charging and discharging as a secondary battery of approximately 2 V. As described above, using an aqueous electrolyte solution as an electrolyte solution, and also using a specific cathode active material and anode active material made it possible to make a dual-ion secondary battery of high power and a high level of safety.

In this example, the concentration of LiTFSI in the aqueous electrolyte solution was 21 mol/kg-H$_2$O. According to the findings of the inventors of the present application, the concentration of LiTFSI in the aqueous electrolyte solution of approximately 10 mol/kg-H$_2$O makes it possible to perform charging and discharging as describe above. That is, the concentration of LiTFSI in the aqueous electrolyte solution may be no less than 10 mol/kg-H$_2$O.

2. Comparative Example

Figure 3:
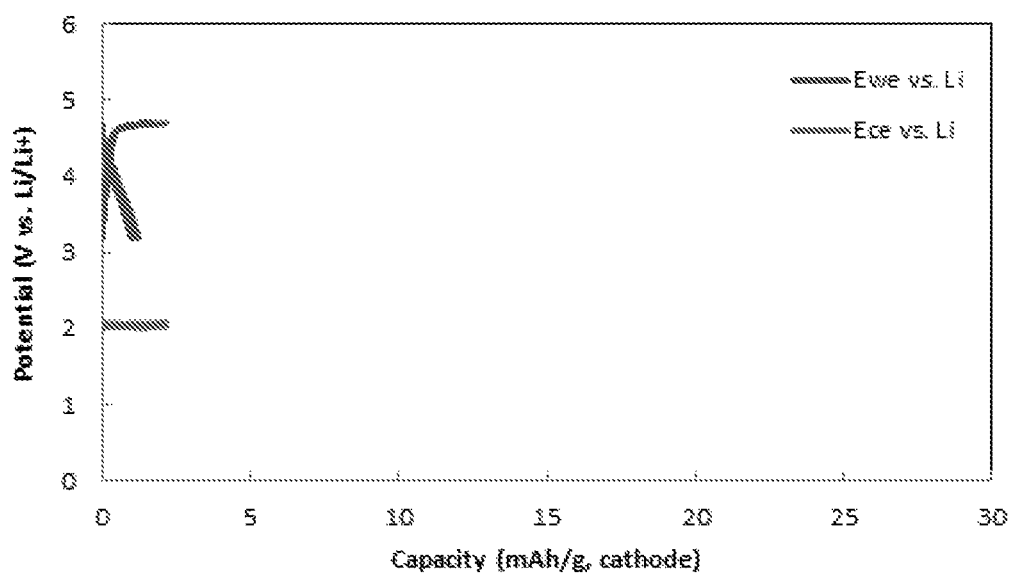
FIG. 3 shows charge-discharge curves of an aqueous dual-ion secondary battery according to Comparative Example.

A dual-ion secondary battery was made in the same way as the Example except that carbon black was used as a cathode active material, instead of graphite. However, as shown in FIG. 3, when carbon black was used as a cathode active material, TFSI anions were not inserted or extracted well, which made it difficult to operate the battery as a secondary battery.

INDUSTRIAL APPLICABILITY

The aqueous dual-ion secondary battery of this disclosure has high power, is superior in safety, and can be used in a wide range of power sources such as an onboard large-sized power source, and a small-sized power source for portable terminals.

REFERENCE SIGNS LIST 10 cathode
11 cathode active material
12 binder
13 cathode current collector
20 anode
21 anode active material
22 binder
23 conductive additive
24 anode current collector
30 aqueous electrolyte solution
31 separator
100 aqueous dual-ion secondary battery

What is claimed is:

1. An aqueous dual-ion secondary battery comprising:
   a cathode;
   an anode; and
   an aqueous electrolyte solution,
   wherein the cathode includes graphite as a cathode active material, and the cathode active material is contained in a cathode active material layer in an amount of between 40 mass % to 99 mass % of the cathode active material layer,
   the anode includes titanium oxide as an anode active material, and
   the aqueous electrolyte solution contains no less than 10 mol of lithium bis(trifluoromethanesulfonyl)imide per kilogram of water.

2. The aqueous dual-ion secondary battery of claim 1, wherein the cathode active material does not include lithium.

* * * * *